Nov. 27, 1956  W. SHOCKLEY  2,772,360
NEGATIVE RESISTANCE DEVICE
Filed Feb. 11, 1954  6 Sheets-Sheet 1

INVENTOR
W. SHOCKLEY
BY
Arthur J. Torsiglieri
ATTORNEY

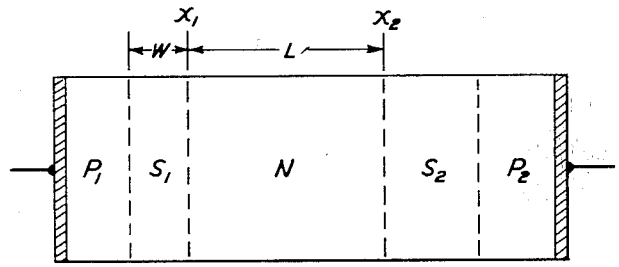
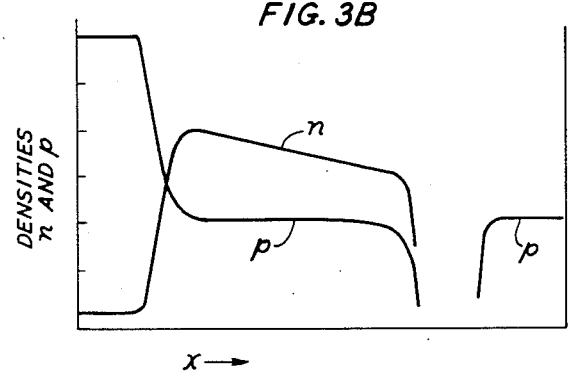
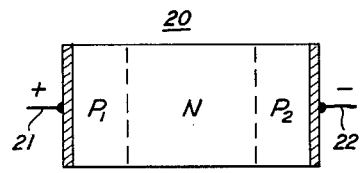
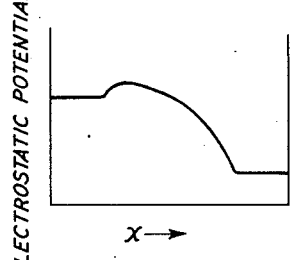
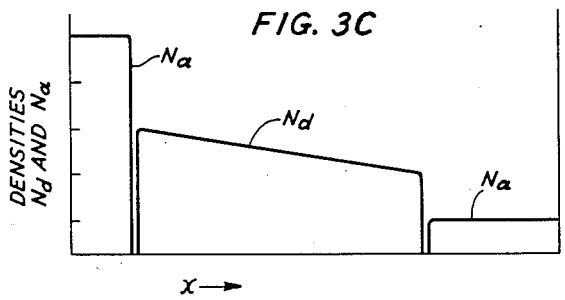
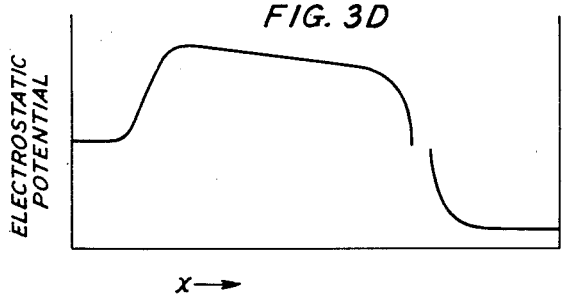

INVENTOR
W. SHOCKLEY
BY
Arthur J. Torsiglieri
ATTORNEY

Nov. 27, 1956

W. SHOCKLEY 2,772,360

NEGATIVE RESISTANCE DEVICE

Filed Feb. 11, 1954

INVENTOR
W. SHOCKLEY
BY
Arthur J. Torsiglieri
ATTORNEY

Nov. 27, 1956     W. SHOCKLEY     2,772,360
NEGATIVE RESISTANCE DEVICE
Filed Feb. 11, 1954     6 Sheets-Sheet 6

INVENTOR
W. SHOCKLEY
BY
ATTORNEY

United States Patent Office 2,772,360
Patented Nov. 27, 1956

2,772,360

NEGATIVE RESISTANCE DEVICE

William Shockley, Madison, N. J., assignor to Bell Telephone Laboratories, Incorporated, New York, N. Y., a corporation of New York Application February 11, 1954, Serial No. 409,667

12 Claims. (Cl. 250—36)

This invention relates to semiconductive translating devices which provide negative power dissipation to alternating signals, applications for translating devices having such negative power dissipation characteristics, and methods for operating semiconductive translating devices to achieve this negative power dissipation characteristic. Such a negative power dissipation characteristic can be described as an A.-C. negative resistance characteristic, and is realized when the product of the signal voltage and the signal current integrated over a complete cycle of the signal is negative. Such a negative integrated product can be achieved by establishing a suitable phase shift between the signal voltage and current.

In my copending application Serial No. 333,449, filed on January 27, 1953, of which this forms a continuation-in-part, there is described a two-terminal or diode semiconductive element across which is developed a negative resistance to an alternating signal by properly correlating the structural and operating parameters of the element so that the period of the operating frequency and the transit time of charge carriers across a particular region of the element are related in a specified manner. The present invention relates more specifically to improved two-terminal semiconductive elements of this general kind.

Two-terminal elements are becoming of increasing importance with the trend towards higher and higher operating frequencies. It is characteristic that signals of increasing frequency require for translation components of decreasing size. It is evident that the difficulty of fabricating small structures increases with the number of electrodes or terminal connections that must be made thereto. A two-terminal or diode element represents the ultimate that can be realized in structural simplicity.

Moreover, diodes also appear to be the best fitted for operation at the very high frequencies. It is possible to have diodes which are much smaller in one dimension than the other two and which exhibit negative resistance and thus give A.-C. power at frequencies comparable to the reciprocal of the transit time across the diode. For example, it is difficult to conceive of a structure having the potentiality of operating at higher frequencies than a semiconductive diode in which a grain boundary formed of edge type dislocations serves in a manner analogous to the grid of a vacuum tube by acting as a locus for an atmosphere of donors or acceptors and in which the spacings of the two zones defining the grain boundary in the direction perpendicular to the grain boundary are made comparable to a mean free path of the carriers used. Such a concentration can be realized by allowing impurities to diffuse down the dislocations of a narrow angle grain boundary, making use of the fact that diffusion in solids tends to proceed more rapidly along grain boundaries.

Such negative resistance diodes are attractive not only because they can be used in tuned circuits as an active element in providing oscillations, but also because they can be used in combination with nonreciprocal elements to form "dissected" amplifiers. Combinations of negative resistance diodes and nonreciprocal elements can lead to structures having gain and unilateral transmission properties that simulate conventional vacuum tube amplifiers. The adjective "dissected" seems appropriate for such amplifiers since the elements giving the power gain are physically separated from those providing the unilateral transmission properties. Typical dissected amplifiers which can incorporate negative resistance elements in accordance with the invention are described in application Serial No. 302,278, filed August 1, 1952, application Serial No. 303,642, filed August 1, 1952, and application Serial No. 364,291, filed June 26, 1953. Among the nonreciprocal elements utilized in the dissected amplifiers described in the afore-mentioned applications are Hall effect plates, gyrators and ferrite isolators.

For purposes of analysis, it is found convenient to define for each of the two-terminal translating elements to be considered an impulsive impedance $D(t)$ which is a measure of its transient response to an impulse of current superimposed on a steady state condition. In terms of such an impulsive impedance a structure suitable for exhibiting the desired negative resistance is found to have an impulsive impedance characteristic which deviates upward from a linear fall when plotted against time. Viewed in another aspect, it is desirable to produce an interval of time with relatively high values of $-D'(t)$ compared to earlier times, where $D'(t)$ is the derivative with respect to time of the impulsive impedance characteristic.

In my above-identified copending application various structures are described for achieving a favorable impulsive impedance characteristic. Among the structures described is a unipolar diode in which only one type of carrier is present in sufficient numbers to have an appreciable effect. This diode includes a plurality of contiguous zones having different predominances of charge carriers. By means of a voltage applied to the two terminals of the diode, there is provided therein a first barrier which is biased in the forward direction to inject charge carriers into an intermediate zone and a second barrier which is biased in a reverse direction to collect the injected charge carriers from the intermediate zone. The characteristics of the intermediate zone are chosen to introduce an appreciable delay to the injected carriers as they diffuse and drift thereacross. The characteristics of the second barrier are chosen to set up there a space charge region through which the charge carriers pass quickly but where most of the voltage applied across the two terminals drops. As a result, there is introduced a phase shift between the voltage applied across the two terminals and the current in an external circuit connected serially thereto. By suitably relating the frequency of the applied signal voltage to the transit time of the charge carriers through the intermediate zone, the diode can be made to exhibit a negative resistance to the signal. The present invention relates to such unipolar diodes, and more advantageously to such diodes in which the predominant charge carriers are holes.

Before proceeding into a discussion of the features forming the bases of the present invention, it will be helpful to set forth definitions of certain terminology to be employed below together with a brief discussion of these terms. For a more complete exposition regarding these terms and their significance, reference is made to W. Shockley's book "Electrons and Holes in Semiconductors" published by D. Van Nostrand Co., Inc.

Conduction occurs in electronic semiconductors by means of two types of charge carriers, namely electrons, which are negative charge carriers, and electron deficits or holes, which may be considered as positive charge carriers. These carriers can be provided in the semiconductor in several ways including: The application of sufficient energy to break an electron away from its semiconductive atom, thus creating an unbound electron and an unbound hole; the presence of lattice defects in the semiconductor structure; and the presence of certain elements in the crystal structure which have either an excess or a deficit of valence electrons so that they provide a source of unbound holes or electrons which can be released by the application of a low level of external energy to the crystal. Generically, those semiconductors wherein conduction is in the main by electrons are called n-type while those where conduction occurs by electron deficits or holes are called p-type. Where it is desirable to identify the characteristics of the materials with more particularity n+ and p+ will identify materials which have a marked predominance of the characteristic type of charge carrier. Nu, $\nu$, and pi, $\pi$, will be employed to signify that the material contains only a slight predominance of the characteristic type of carriers, i. e., $\pi$-type material is weakly p-type and $\nu$-type is weakly n-type. Intrinsic material, that in which the electrons and holes are in substantial balance, will be identified as i-type.

Silicon and germanium, for example, are typical semiconductors having a diamond cubic lattice form wherein each of the four valence electrons of each atom normally form an electron pair bond with a valence electron of each of four adjacent atoms. These materials occur both as n and p type and are readily controlled in their type by the presence of the above-mentioned elements. Those elements constituting impurities which contribute electrons to semiconductors are termed donors and principally fall in the fifth group of the periodic table while those elements which contribute electron deficits are termed acceptors and generally occur in the third group of the periodic table. Typical donors include phosphorus, arsenic, and antimony, while boron, aluminum, gallium and indium are typical acceptors. Acceptors and donors will be referred to below as significant impurities to distinguish them from other materials which may be present in the semiconductor. The introduction of significant impurity atoms to provide charge carriers is usually described as "doping."

The conductivity and conductivity type of a semiconductor are dependent upon the predominance of donors or acceptors present, since donors and acceptors tend to compensate each other, the excess electron of the donor filling the electron vacancy of the acceptor. When the semiconductor contains a balance of electrons and holes at thermal equilibrium, it is identified as an "intrinsic semiconductor" while semiconductive material in which one type of charge carrier predominates is known as "extrinsic." The conductivity transition regions between zones of opposite conductivity type in a semiconductive body are known as p–n junctions or more generically as "barriers," this term applying herein also to metal-semiconductor junctions, junctions between two zones having the same charge carrier predominant but to different degrees, and extrinsic-intrinsic junctions wherein the energy levels on the two sides of the junction are different.

Some compounds are also effective electronic semiconductors, for example copper oxide, cadmium sulfide, thallius sulfide, silicon carbide and lead sulfide may be employed. These materials may be either n or p type depending upon the donor or acceptor predominance present. Here the donors and acceptors may be provided by impurities, either as elements or compounds, or by deviations from the stoichiometric balance of semiconductive compounds.

Semiconductive bodies having adjacent zones of the desired conductivity type can be produced by a number of techniques including the segregation of impurities while an ingot is progressively cooled as disclosed in Patents 2,567,970 and 2,602,211 of J. H. Scaff and H. C. Theuerer, September 18, 1951, and July 8, 1952, respectively, the heat treatment of a portion of the body at a particular temperature as taught in Scaff et al. Patent 2,602,763, July 8, 1952; the diffusion of impurities from the body surface into its bulk as disclosed in G. L. Pearson application Serial No. 270,370, February 7, 1952, and C. D. Thurmond application Serial No. 321,405, November 19, 1952, and the addition of impurities to a melt as a body is formed therefrom. Advantageously, the semiconductive bodies employed in the negative resistances under discussion may be formed from single crystal material in the manner disclosed in patent applications Serial No. 138,354 of J. B. Little and G. K. Teal, January 13, 1950, Serial No. 168,184 of G. K. Teal, June 15, 1950, and Serial No. 256,791 of W. G. Pfann, November 16, 1951.

Junctions produced by these methods have characteristics which enable them to be employed as sources or emitters of charge carriers when energy is applied properly. A junction biased in the forward direction, i. e., with the applied voltage poled to draw that type of charge carrier predominating on one side of the junction across it, constitutes an excellent emitter, particularly when the emitting material contains a large predominance of the emitted type of carrier. Thus, holes are emitted from a p–n junction into the n zone when the latter is biased negative relative to the p zone.

Means other than forward biased junctions for injecting charge carriers into a semiconductor include forward biased metallic contacts, reverse biased barriers having a field at some point in excess of the critical breakdown field which results in the generation of hole electron pairs, and means for directing energy onto the semiconductor to excite electrons into the conduction band, e. g., heat, light and high energy particles.

A space charge region encompasses a reverse biased junction due to the tendency of the bias to draw the majority charge carriers out of the vicinity of the junction leaving ionized acceptors and donors on the p and n sides thereof, respectively. The extent of this space charge region is dependent upon the applied voltage and inversely upon significant impurity predominance on each side of the junction. Hence, a junction which has a low donor predominance on the n side and a high acceptor predominance on the p side will have a space charge region extending a large distance from the center of the junction into the n-type material relative to its distance into the p-type material. An equal number of acceptors and donors must be ionized on the respective sides of the junction and this necessarily requires that a greater volume of the material having the low carrier density be affected. Space charge regions contain very high fields even for small biases. Hence, any carriers entering a space charge region will traverse it quickly, i. e., the transit time will be very small. Another characteristics of a space charge region is that it has a capacitance which is inversely proportional to its thickness.

It is to be understood that space charge regions can be establishd in semiconductors in several ways in addition to applying a reverse bias across a p–n junction. For example, a space charge region may be established in a semiconductive body adjacent a metallic connection thereto by biasing the barrier between the two in the reverse direction, i. e., so that the voltage tends to draw minority carriers out of the semiconductor. As another example, such a region may be produced by applying a suitable potential between the semiconductor and insulator contiguous therewith.

With the basic terminology defined, it is now convenient to return to a discussion of the invention.

One feature of the present invention is the cooperative association of a semiconductive body including a pair of zones or regions having the same predominant charge carrier and an intermediate zone in which the concentration of this charge carrier is less than in said pair of zones with means for establishing in the intermediate zone of the body an electric field which puts this zone in the range of negative differential mobility $\mu^*$ for the charge carrier predominant in the pair of zones where $$\mu^*(x) = \frac{dv(E)}{dE(x)}$$

and $v(E)$ is the drift velocity of the holes as a function of the electric field $E(x)$.

It is a consequence of the nature of energy bands in solids that at sufficiently high electric fields holes in suitable semiconductive materials should exhibit a negative value of differential mobility $\mu^*$. This is believed to result because holes can lose energy to phonons (quanta of thermal vibrations of the crystal lattice) at a certain maximum average $P_{max.}$, which rate is achieved when the energy of the holes is near the middle of the valence band. Under these conditions the power absorbed from the electric field can be no greater than $P_{max.}$. However, the power absorbed is a function of the product of the drift velocity and the electric field, and accordingly, beyond a certain range of electric field, further increases in the electric field result in decreases in the drift velocity. It is important to insure that at these high electric fields breakdown effects will not provide secondary generation of electron-hole pairs. However, if the width of the valence band is less than the forbidden energy gap between the top of the valence band and the bottom of the conduction band, then a hole cannot under any circumstances acquire enough energy to produce electron-hole pairs. Thus in such a case, the negative resistance range is reached before breakdown effects occur. Moreover, it is sufficient to avoid the generation of a significant number of hole-electron pairs if the level of average maximum power absorption is nearer the top of the valence band than the bottom of the conduction band. Silicon carbide and diamond, for example, are materials in which the valence band is relatively narrow compared to the energy gap and which therefore are well adapted for use in embodiments of the invention. Diamond, although at normal temperatures has more the characteristics of an insulator than a semiconductor, can be treated to behave as a semiconductor for the purposes of the invention.

In the specific embodiments of the invention to be described, the semiconductive body comprises a pair of terminal zones in which holes are predominant and an intermediate zone which serves as the transit time or delay zone and in which holes are less predominant or may even be in the minority. By means of a voltage applied across the terminal zones, there is established in the intermediate zone an electric field which puts this zone in a range of negative differential mobility to holes moving therethrough. By suitably relating the period of the applied signal voltage and the transit time of holes moving through the intermediate zone, a negative resistance to the applied signal is achieved.

The invention will be better understood from the following more detailed description taken in conjunction with the accompanying drawings in which:

Figs. 1A through 1C and 2A through 2C are plots which will be useful in developing the concept of impulsive impedance;

Figs. 3A through 3D relate to the characteristics of a bipolar p-n-p diode substantially of the kind described in my copending application Serial No. 333,449 filed January 27, 1953, and will be helpful in introducing the principles of the present invention;

Figs. 4A and 4B relate to the characteristics of a unipolar p-n-p diode of a kind which can be operated in accordance with the present invention;

Before discussing specific embodiments of the invention, there will be developed the concept of impulsive impedance.

The impulsive impedance $D(t)$ for a two-terminal device is defined in terms of its transient response to an impulse of current. Thus if the current through the device is $$J(t) = J + j(t)$$

where $J$ is the D.-C. current and $$j(t) = 0$$

except very near $t = 0$ and $$j(t)dt = \delta Q$$

then the voltage is $$V(t) = V + v(t)$$

where $V$ is the D.-C. voltage and $$v(t) = \delta Q D(t)$$

In other words, if in addition to the D.-C. biasing current, a charge $\delta Q$ is instantaneously forced through the circuit at time $t=0$, the added voltage is $D(t)$ per unit charge. These equations also serve to introduce the notation used in this specification.

In general quantities that are functions of time or position will have the functional dependence explicitly indicated. In an analysis of the transient response which appears at a later portion of the specification, however, the symbol $\delta$ will be used to distinguish the transient parts $\delta E$ and $\delta \rho$ from the D.-C. parts of the electric field and charge density, respectively.

Capital $V(t)$ and $J(t)$ stand for total voltages and current. Without functional dependence upon $(t)$ they are the D.-C. parts. Similarly $v(t)$ and $j(t)$ are the A.-C. or transient parts. A sinusoidal disturbance is written as $$v(t) = v \exp i\omega t$$

$$j(t) = j \exp i\omega t$$

where $v$ and $j$ are not functions of time. Where it is necessary to distinguish the displacement current at a particular location from the conduction current, we shall write $$j(D, S_2, t)$$

meaning the displacement current across space charge region $S_2$ as a function of time.

For the moment we shall treat $J$ and $j$ as circuit currents. Subsequently, we shall be concerned with current densities and shall use the same symbols.

The complex impedance of the device is evidently $$Z(\omega) = v/j$$

where $v$ and $j$ are the coefficients in the sinusoidal case.

In terms of the system of notation introduced above, $Z(\omega)$ may also be expressed in terms of $D(t)$ by expressing $j \exp(i\omega t)$ in terms of increments of charge $$dQ = je^{i\omega t'}dt'$$

and summing over all increments up to time $t$. This leads to $$Z(\omega) = \int_0^\infty D(t) \exp(-i\omega t)dt \qquad (1)$$

A negative resistance will occur if $$0 > \int_0^\infty D(t) \cos \omega t \, dt$$

$$= (-1/\omega)\int_0^\infty D'(t) \sin \omega t \, dt \qquad (2)$$

the latter form coming from integration by parts for the case of $D(\infty)=0$, the only situation treated in this specification.

Figure 1A:
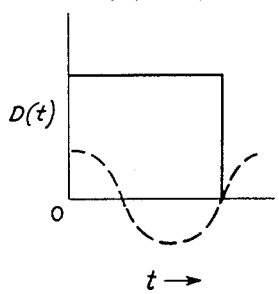
Figure 1B:
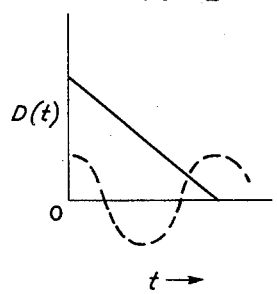
Figure 1C:
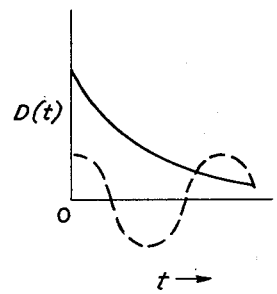

The use of $D(t)$ in analysing the potential merits of diode structures from the point of view of negative resistance is illustrated in Figs. 1A through 1C. Here three cases of $D(t)$ together with certain cosine waves are shown. It is seen for the case shown in Fig. 1A that a negative real part of Z will be obtained. For the case represented by Fig. 1B the real part of Z is zero for the frequency shown; this represents a limit; for other frequencies, a positive real part will be obtained. The case shown in Fig. 1C represents an exponential fall such as might occur for a capacitor and resistor in parallel. We shall discuss this example further below.

Figure 2A:
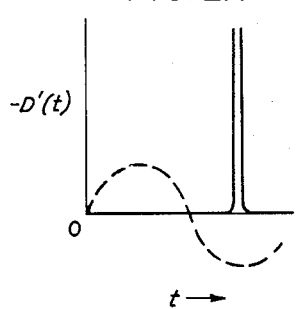
Figure 2B:
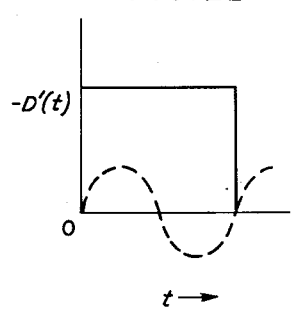
Figure 2C:
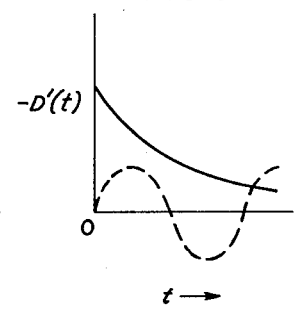

The conclusions regarding the cases represented by Figs. 1A and 1B may be more easily seen from the corresponding $-D'(t)$ plots shown in Figs. 2A through 2C. From Fig. 2A it can be seen that the negative maximum in the sine wave at the end of the rectangular $D(t)$ plot is particularly favorable. From Fig. 2B it is seen that no choice of $\omega$ will result in more negative area of sine wave than positive. For Fig. 2C it is evident that each positive half cycle of the sine wave gives a larger contribution than the following negative half cycle and hence that a positive resistance will be obtained.

For the case represented by Figs. 1C and 2C, it is instructive to obtain the value of Z analytically by using $$D(t) = C^{-1} \exp(-t/RC)$$

This leads correctly to $$Z(\omega) = (R^{-1} + i\omega C)^{-1}$$

For small values of $\omega RC$, Z reduces to R; furthermore, for this case, the decay of $D(t)$ occurs while $\cos \omega t = 1$. Under these conditions $$Z(\omega) = \int_0^\infty D(t)dt$$

This result is useful for estimating the effect of quickly decaying contributions to $D(t)$. These evidently contribute a positive resistance to Z equal to the area under the $D(t)$ curve.

From these considerations it follows that an upward deviation from the linear fall shown in Fig. 2B towards the characteristic shown in Fig. 2A will result in negative resistance. Subsequently, we shall see how particular structures may lead to such favorable, convex-upwards characteristics for $D(t)$.

By way of introduction we shall consider the behavior of the p–n–p diode shown in Fig. 3. We will use capital letters P and N to designate specific regions reserving the small letters to indicate carrier densities and conductivity types.

Several assumptions that simplify the theoretical treatment are made as follows:

(a) The $P_1N$ junction is considerably more heavily doped on the $P_1$ side.

(b) The doping in the layer N varies exponentially with distance across the layer.

(c) Throughout N the concentration of holes is less than the electron concentration.

(d) The thickness of N is large compared to the depth of space charge penetration into it.

(e) The voltage drop across the space charge region $S_2$ is large compared to the other voltage drops. Figs. 3B and 3C show the relative densities of the charge carriers and the significant impurities, respectively, across the diode, and Fig. 3D shows the electrostatic potential distribution.

It can be shown that these conditions lead at the operating frequency $\omega$ to the following consequences:

(1) The current across the first $P_1N$ junction is carried preponderantly by holes.

(2) The hole drift in N is substantially unaffected by the A.-C. field and thus represents the delayed diffusing and drifting current injected across the first junction.

(3) The A.-C. voltage drop occurs chiefly across $S_2$.

We shall first calculate the impulsive impedance of this diode.

If the total current is $$J(t) = J + je^{i\omega t} \qquad (3)$$

then the A.-C. hole current across $S_1$ is in the notation discussed above with the addition of the symbol $p$ to indicate holes $$j(p,S_1,t) = je^{i\omega t} \qquad (4)$$

This current flows through the $n$-layer unaffected by the A.-C. field and arrives at $S_2$ delayed and attenuated by a complex factor $$\beta = |\beta| \exp(-i^\theta) \qquad (5)$$

Because of the high field in $S_2$, the transit time there is negligible so that the hole current arriving at $P_2$ is $$j(p,S_2)e^{i\omega t} = \beta j e^{i\omega t} \qquad (6)$$

In addition to this current, there is a dielectric displacement current in $S_2$ which is converted to hole conduction current in $P_2$. If the voltage drop across $S_2$ is $$V(S_2,t) = V(S_2) + v(S_2)e^{i\omega t} \qquad (7)$$

then the A.-C. displacement current is $$j(D,S_2)e^{i\omega t} = i\omega C_2 v(S_2)e^{i\omega t} \qquad (8)$$

Now the total current is constant through the device, hence $$j = j(p,S_2) + j(D,S_2) \qquad (9)$$

which leads to $$j = i\omega C_2 v(S_2)/(1-\beta) \qquad (10)$$

If $v(S_2)$ is substantially equal to the A.-C. voltage across the unit, then the impedance is $$Z = v(S_2)/j = (1/i\omega C_2) + i\beta/\omega C_2 \qquad (11)$$
$$= (1/i\omega C_2) + (1/\omega C_2)|\beta| \exp i[(\pi/2) - \theta]$$

Evidently if $\theta > \pi$ and $\theta < 2\pi$, the second term will have a negative real part so that the diode will act as a power source.

If we neglect the A.-C. electric field in N then $\beta$ may be calculated in terms of the thickness $L = x_2 - x_1$ of the layer and the potential drop across the layer. This latter arises from the concentration ratio $N_{d1}/N_{d2}$ between the two sides of N. Since the donor charge density is neutralized substantially entirely by electrons, and since almost no electron current flows, the electron concentration difference must result from a Boltzmann factor (at the concentration here involved Fermi-Dirac statistics are not needed) and this leads to $$\Delta V_n = (kT/q)ln(N_{d1}/N_{d2}) \qquad (12)$$

for the potential drop across N. The Boltzmann factor $kT$ and Fermi-Dirac statistics are discussed in chapter 10 of my previously identified book entitled "Electrons and Holes in Semiconductors." In N the electric field is thus $$E = \Delta V_n/L \qquad (13)$$

The differential equation for hole concentration for a disturbance of frequency $\omega$ is $$\frac{\partial p}{\partial t} = i\omega p = -\mu E \frac{\partial p}{\partial x} + D_p \frac{\partial^2 p}{\partial x^2} \qquad (14)$$

This linear differential equation has two linearly independent solutions. These must satisfy at $x_2$, the left edge of the space charge layer $S_2$, the boundary condition that the hole density is practically zero. The appropriate solution is $$p = e^{i\omega t}(e^{k_1(x-x_2)} - e^{k_2(x-x_2)}) \qquad (15)$$

where $$Lk_1 \equiv (x_2-x_1)k_1 = \alpha[1+(1+i\gamma)^{1/2}] \qquad (16)$$

$$Lk_2 \equiv (x_2-x_1)k_2 = \alpha[1-(1+i\gamma)^{1/2}] \qquad (17)$$

where $$\alpha = q\Delta V/2kT \qquad (18)$$

$$\gamma = 4\omega D_p/u^2 \qquad (19)$$

$$u = \mu_p E = \mu_p \Delta V/L \qquad (20)$$

The current is $$j(p,x,t) = q(up - D_p \partial p/\partial x) \qquad (21)$$

and the ratio of currents at $x_1$ and $x_2$, which is $\beta$ by definition is $$\beta = j(p,x_2,t)/j(p,x_1,t) = \frac{Lk_1 - Lk_2}{Lk_1 \exp(-Lk_2) - Lk_2 \exp(-Lk_1)} =$$

$$\frac{2(1+i\gamma)^{1/2}e^\alpha}{[1+(1+i\gamma)^{1/2}]\exp \alpha(1+i\gamma)^{1/2} - [1-(1+i\gamma)^{1/2}]\exp -\alpha(1+i\gamma)^{1/2}} \qquad (22)$$

The phase lag in $\beta$ must exceed 180° or $\pi$ in order to give negative resistance. It can be seen that this phase factor must result from the first exponential in the denominator by the line of reasoning suggested below: The real part of the exponent is larger than the imaginary part. Hence the absolute ratio of the two exponentials is at least $2\pi$. For this condition the second term in the denominator is negligible compared to the first. Hence the phase of (22) is determined largely by the first exponential. As a helpful approximation we may neglect the second term and write $$\beta = \frac{2(1+i\gamma)^{1/2} \exp[\alpha-\alpha(1+i\gamma)^{1/2}]}{1+(1+i\gamma)^{1/2}} \qquad (22A)$$

The treatment presented above has been based upon the conditions (a) to (e) set forth earlier. Some of these are advantageous from the point of view of operation but others have been introduced to simplify the treatment. Among the latter is the condition that the current across $S_1$ is carried chiefly by holes. If the current were chiefly capacitative at this junction, then the voltage would lag 90° behind the current. This adds a desirable phase lag in the hole injection across $S_1$ and thus requires less phase shift in the $n$-layer. By suitably adjusting the ratio of capacitative and inductive admittances, a net improvement may be obtained. Moreover, in this diode the electric field produced by the injected holes has a negligible influence on the motion of the injected holes. This results from the bipolar nature of the mode of operation considered, the majority carriers in the N region acting to shield the minority carriers from their own space charge.

It will now be possible to analyze specific configurations in accordance with the invention. Fig. 4A shows a p–n–p diode 20 in which only hole carriers are present in sufficient numbers to have a major effect and the influence of the space charge of the hole carriers upon their motion plays an important role. To this end the dimensions of the several zones, the density of the significant impurities and the potential applied across terminals 21 and 22 are such that the space charge "punches through" the device. The conditions for "punch through" operation are set forth in greater detail in an article in the Physical Review, vol. 90, pp. 753–758, entitled "Space-Charge Limited Emission in Semiconductors" by W. Shockley and R. C. Prim. Under these circumstances a condition of space charge limited emission is set up so that holes are injected from the positive region $P_1$ to just such an extent that their flow is limited by their own space charge. This limitation is associated with the maximum of potential just inside N. Fig. 4B shows the electrostatic potential distribution along the diode 20 after the operating biases shown have been applied.

The potential maximum is evidently a "hook" for electrons generated thermally in $P_2$ and in N. This means that there is provided a region in which electrons tend to collect. Under some circumstances electrons may accumulate and form a layer in which there is no electron flow and hole flow is carried equally by diffusion, and drift. Such stagnant regions will tend to be suppressed if $P_1$ is made of short lifetime material, so that electrons are siphoned out of N, or if $p$ at the maximum is larger than $p$ for intrinsic material and the lifetime is locally low.

We shall treat the transient response of this diode 20 from the point of view of the impulsive impedance discussed above. Accordingly we suppose that a steady current J flows per unit area. At $t=0$ an added pulse current occurs carrying a total charge of $\delta Q_i$ per unit area, the subscript "$i$" signifying initial condition. The problem is to determine how this added charge is carried by a transient disturbance in the hole flow and what is the resultant dependence of voltage upon time: By definition the added voltage across the device is $$v(t) = \delta Q_i D(t) \qquad (23)$$

Since we are dealing with a planar model, we shall suppose that the initial condition at $t=0$ corresponds to added charges $\delta Q_i$ and $-\delta Q_i$ on the metal plates on the P-regions. These charges set up an added field $$\delta E_i = \delta Q_i/K \qquad (24)$$

where

K is the permittivity of free space in MKS units. The initial value $v(0)$ is then simply $\delta E_i$ times the total width of the structure.

The first effect, which takes place in a negligible time in respect to the frequencies involved, is the dielectric relaxation of the field in $P_1$ and $P_2$. The added current due to $\delta E_i$ leads to an exponential decay of $\delta E$ in these regions with a transfer of $\delta Q_i$ and $-\delta Q_i$ to the two boundaries of N. If $P_1$ and $P_2$ are thin compared to N, the resulting drop in $v(t)$ is small. In any event it can be shown by the reasoning used earlier in the discussion of impulsive impedance that this contribution to $D(t)$ adds simply the series resistance of $P_1$ and $P_2$ to the impedance.

The next effect is the transport of $\delta Q_i$ on the left side into N by hole flow over the potential maximum. It will be easier, however, to discuss this process after the treatment of the transient effects that occur in N itself. Consequently, we shall at this point assume that after a time, short compared with the important relaxation time in the structure, the disturbance of hole density is as shown in Fig. 4A.

Figure 5A:
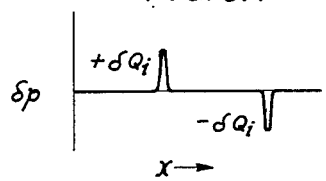
Figs. 5A, 5B, 6A and 6B illustrate transient hole pulse and field conditions in the diode shown in Fig. 4A.

Fig. 5A shows added charges $+\delta Q_i$ and $-\delta Q_i$ produced by a disturbance denoted as $\delta p$ in the hole density. The charge $-\delta Q_i$ on the right side is produced by an increased penetration of the space charge into $P_2$; it is similar to that produced by increasing reverse bias on a p-n junction.

Figure 6A:
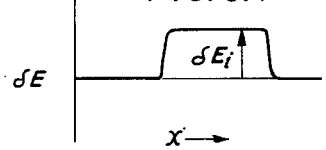

Fig. 6A shows the corresponding disturbance in electric field. This disturbance is denoted by $\delta E$ which is a function of $x$ and $t$ where $x$ is the distance along the body and $t$ is time. Evidently $$v(t) = \int_0^L \delta E(x,t) dx \qquad (25)$$

and this is the area under the $\delta E$ curve.

Figure 5B:
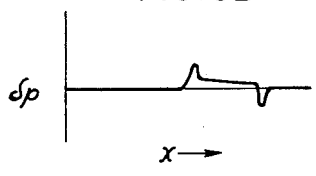
Figure 6B:
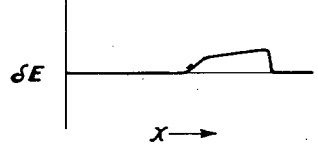

Figs. 5B and 6B indicate qualitatively a subsequent stage in the motion and decay of $\delta p$ and $\delta E$. The problem is to formulate mathematically this decay process. We shall treat the decay process in terms of the effect of drift in the electric field and neglect the effects of diffusion. This procedure can be justified by the fact that as soon as a hole had reached a point where the potential has fallen by $kT/q$ below the maximum, its flow is governed by drift rather than diffusion and the predominance of drift continues to increase towards the right. This is discussed more fully in the aforementioned Physical Review article.

If drift in the field is the predominant cause of hole flow, then the equations governing the situation in N are $$J + \delta J = (\rho + \delta\rho)(u + \delta u) \qquad (26)$$

where the terms with $\delta$ represent the transient effects and those without represent the steady state solution and $\rho = qp$ is the charge density of the holes and $u$ their drift velocity. The equation for the change of E with distance is $$K(\partial/\partial x)(E + \delta E) = \rho_f + \rho + \delta\rho \qquad (27)$$

where $\rho_f$ is the fixed charge density due to donors and acceptors. (We neglect any effect of traps which are centers corresponding to an energy which is between the top of the valence band and the bottom of the conduction band and in which charge carriers may be temporarily held.) The steady state equation for E is thus $$K(dE/dx) = \rho_f + J/u \qquad (28)$$

In a region where $\rho_f$ is independent of $x$, this equation may be reduced to quadratures by writing $$KdE/(\rho_f + J/u) = dx \qquad (29)$$

the left side is then a known function of E through the dependence of $u$ upon E.

It is convenient to introduce a time like variable $s$ which is the transit time for the D.-C. solution. Evidently $$ds = dx/u = KdE/(\rho_f u + J) \qquad (30)$$

For the case of space charge limited current, $s$ may be conveniently measured from the potential maximum. Even though the solution is invalid at that point, the integrals converge and the contribution from the region within $kT/q$ of the maximum is small.

We shall assume that the equations for the steady state case have been solved and that the functional relationships are known between E, $x$, $v$ and $s$.

The differential equation for $\delta E$ may then be obtained as follows: To the left of the pulse in $\delta p$ in Fig. 5A, $\delta E$ is zero. From Equation 27 we have $$K\partial \delta E(x)/\partial x = \delta\rho \qquad (31)$$

Integrating this from the region where E is zero gives $$K\delta E(x,t) = \int_0^x \delta\rho(x,t) dx \qquad (32)$$

Equation 32 states that the dielectric displacement at $x$ is equal to the excess charge between the potential maximum and $x$. Evidently during the transient following Fig. 5A, the rate of change of this extra charge is $-\delta J(x,t)$ since the D.-C. current is flowing in at the left and an excess current $\delta J$ flows out at the right. Hence we have $$K\partial \delta E/\partial t = -\delta J = -(\delta\rho u + \rho \delta u) \qquad (33)$$

For the change in drift velocity we may write $$\delta u = (du/dE)\delta E = \mu^* \delta E \qquad (34)$$

For high electric fields the velocity $u$ increases less rapidly than linearly with E and the differential mobility $\mu^*$ is less than the low field mobility. For very high high fields $\mu^*$ is nearly zero and in suitable materials is a range in which the differential mobility $\mu^*$ is negative. It is in accordance with the present invention to operate in this range.

Figure 7A:
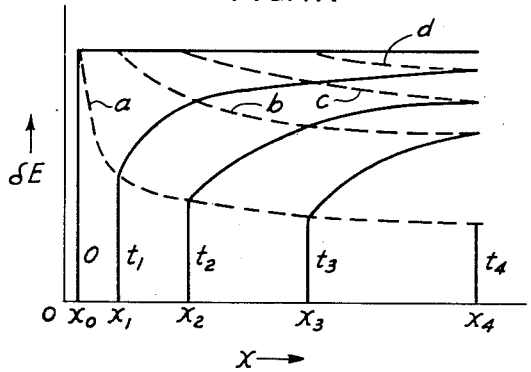
Figs. 7A and 7B illustrate graphically the dependence of the transient hole pulse and electric field upon time.
Figure 7B:
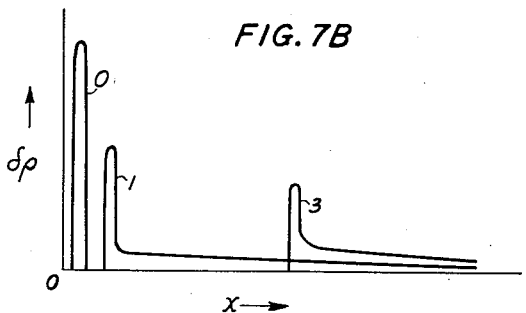

In Figs. 7A and 7B we show a diagrammatic representation of the transient solution. Each of the dashed lines represents the decay of $\delta E$ as measured in a moving coordinate system. Thus we consider $\delta E$ measured at a position $x(s_0 + t)$, this is a position that moves with the D.-C. velocity $u$. This $\delta E$ is evidently expressed in terms of $\delta E(x,t)$ by writing $x = x(s_0 + t)$:

$$\delta E \text{ in moving system} \equiv \delta E_m(s_0, t)$$
$$= \delta E[x(s_0 + t), t] \qquad (35)$$

The differential equation for $\delta E_m$ is $$(\partial/\partial t)\delta E_m = (\partial \delta E/\partial t)_x + (\partial \delta E/\partial x)_t \partial x/\partial t$$
$$= (\partial \delta E/\partial t)_x + (\partial \delta E/\partial x)_t u$$
$$= -(u\delta\rho + \rho\delta u)/K + (\delta\rho/K)u$$
$$= -(\rho\mu^*/K)\delta E = -\nu \delta E \qquad (36)$$

where the quantity $$\nu \equiv \rho\mu^*/K \qquad (37)$$

is an effective dielectric relaxation constant being the differential conductivity $\rho\mu^*$ divided by the permittivity K.

Evidently $\nu$ is a function of position $x$ only and may be expressed as $\nu(s)$ through the dependence of $x$ upon $s$. Thus we may write $$(\partial/\partial t)\delta E_m(s_0, t) = -\nu(s_0 + t)\delta E_m(s_0, t) \qquad (38)$$

which has a solution $$\delta E_m(s_0, t) = \delta E_m(s_0, 0)[\exp -g(s_0 + t) + g(s_0)] \qquad (39)$$

where $$g(s_0 + t) = \int_{s'}^{s_0 + t} \nu(s) ds \qquad (40)$$

The lower limit $s'$ is chosen for convenience so as to avoid singularities in $g(s)$. This integration shows that $\delta E_m$ decays exponentially as the electrical field would decay in a material whose dielectric relaxation constant changed with time just as $\nu$ changes as observed on the moving plane.

Fig. 7A shows on the dashed lines the decay of $\delta E_m$ on the moving planes. Since $\delta E_m$ is zero to the left of the initial pulse in Fig. 5A, it remains zero on all moving planes which follow the pulse of $\delta Q_0$. This justifies the statement made earlier. The solid curves labelled $t_1$, $t_2$ etc. show the spatial dependence of $\delta E$ for times $t_1$, $t_2$, etc. after the charge $\delta Q_i$ is added.

The values of the transient voltage $v(t)$ at time $t_1$, for example, is the integral under the curve $t_1$. This curve is zero for $x < x(t_1)$ and for $x > x(t_1)$ it is $$\delta E(x, t_1) = (\delta Q_i/K)\exp -[g(s_0 + t_1) - g(s_0)] \qquad (41)$$

where $$x = x(s_0 + t) \qquad (42)$$

If the total transit time across N is S so that $$x(S) = L \qquad (43)$$

then $$v(t_1) = \int_{x(t_1)}^L \delta E(x, t_1) dx \qquad (44)$$

From this expression we can derive the desired formula for $D(t)$. For this purpose the integral over $dx$ is replaced by an integral over $s$. At time $t$ the range of $s$ is evidently from $t$ to $S$ and $dx=u(s)ds$. From this we obtain:

$$D(t)=v(t)/\delta Q_i=(1/K)\int_t^s \exp-[g(s)-g(s-t)]v(s)ds \quad (45)$$

From Fig. 7A we can see that there are competing tendencies in the decay of $D(t)$ some of which tend to produce the desired convex shape discussed earlier and others the concave shape. The effect of the dielectric relaxation constant is adverse and tends to produce an exponential decay. On the other hand the advance of the pulse of holes from left to right in Figs. 5A and 5B proceeds in an accelerated fashion with the result that the range of $x$ over which $\delta E$ is not zero in Figs. 4B and 4D decreases at an accelerated rate. If the dielectric relaxation were zero, this would result in the desired convex upwards shape.

The resultant shape of the $D(t)$ curve is thus sensitive to the exact relationship of the transit time and dielectric relaxation. This can be illustrated by giving the results of an analysis for p-n-p structure, neglecting diffusion and considering the mobility $\mu$ to be constant and positive. The solutions of the D.-C. equations are readily obtained for this case and are set forth in the above-mentioned Physical Review article. For convenience they are repeated here.

$$E=(J\mu\rho_f)(e^{\alpha s}-1) \quad (46)$$
$$x(s)=\mu JK(\mu\rho_f)^{-2}(e^{\alpha t}-\alpha t-1) \quad (47)$$
$$L=x(s)=JK/\mu\rho_f^2)(e^\beta-\beta-1) \quad (48)$$
$$\beta\equiv\alpha s \quad (49)$$

From these it is found that $$lng(s)=(1-e^{-\alpha s}) \quad (50)$$

This leads to $$D(t)=(J/\mu\rho_f^2)[e^\beta+e^{\alpha t}(\alpha t-\beta-1)]$$
$$\equiv(J/\mu\rho_f^2)D(\beta,\alpha t) \quad (51)$$

For $t=0$ this reduces correctly to $L/K$.

Figure 8:
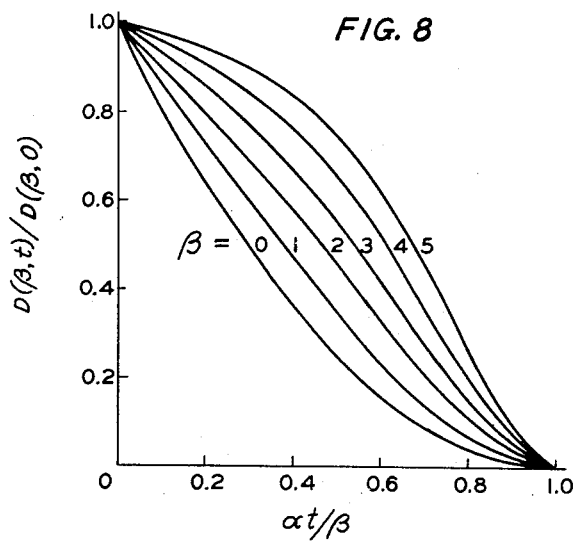
Fig. 8 is a plot of the impulsive impedance of the p-n-p diode of Fig. 4A for various values of the transmission coefficient $\beta$ of the diode.

Fig. 8 shows the resulting shape of the D curves with $\beta$ as a parameter. Large values of $\beta$ correspond to cases in which the hole charge density is small compared to $\rho_f$ and to relatively long relaxation constants. For them the desired convex upward shape results.

Figure 9A:
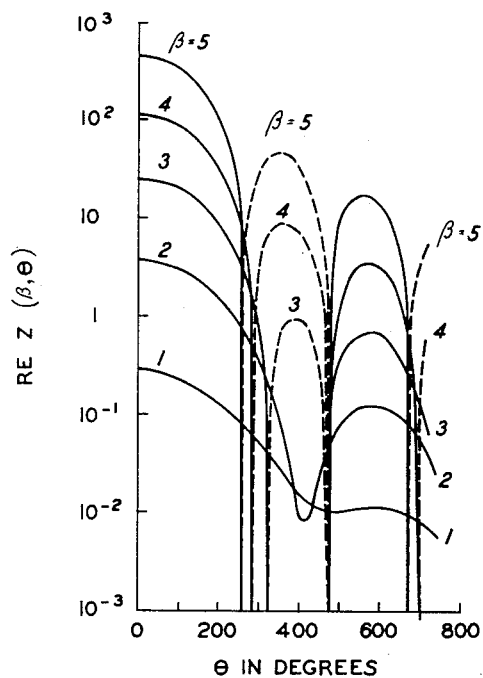
Figs. 9A and 9B are plots of the real and imaginary parts of the impedance of the diode shown in Fig. 4A for various values of the transmission coefficient $\beta$.
Figure 9B:
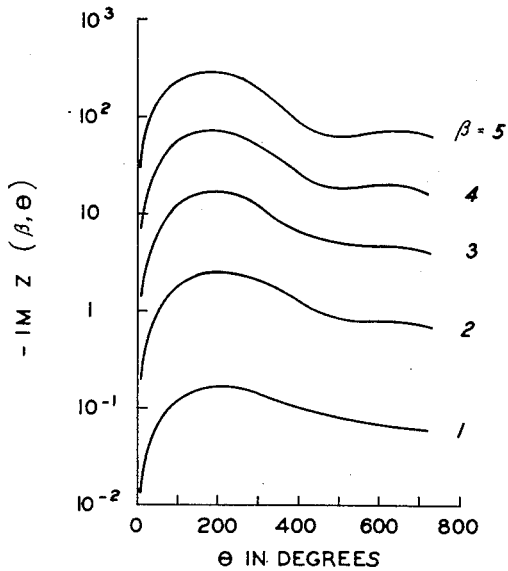

Figs. 9A and 9B show the real and imaginary parts, respectively, of the impedance expressed in terms of $Z(\beta,\theta)$:

$$Z(\omega)=\int_0^T e^{-i\omega t}D(t)dt=(KJ/\mu^2\rho_f^3)Z(\beta,\theta) \quad (52)$$
$$\theta=\omega T \quad (53)$$

It is seen that values of $-Q$ as small as about 10 can be obtained for $\beta\cong3$.

We must return to the question of how the charge $+\delta Q_i$ passes the potential maximum. In order that the theory given above applies, it is necessary that the time required for $\delta Q_i$ to enter the drift region be short compared to the transit time. At the potential maximum the charge density may be estimated by the methods previously dealt with in the theory of space charge limited tension. Initially $+\delta Q_i$ appears to the left of the maximum and the field at the maximum is $\delta E_i$. This field will then relax with a relaxation constant of about $\mu\rho(\max.)/K$ where $\rho(\max.)$ is the hole charge density. Actually the relaxation may be somewhat quicker because the concentration gradient of the added holes also contributes to the flow over the maximum. Since the charge density at $kT/q$ below the maximum is comparable to that at the maximum the entire relaxation process will proceed at about this rate. Thus a criterion for the applicability of the theory is that $K/\mu\rho$ (max.) be much less than $S$, the transit time or total decay time for $D(t)$.

Figure 10:
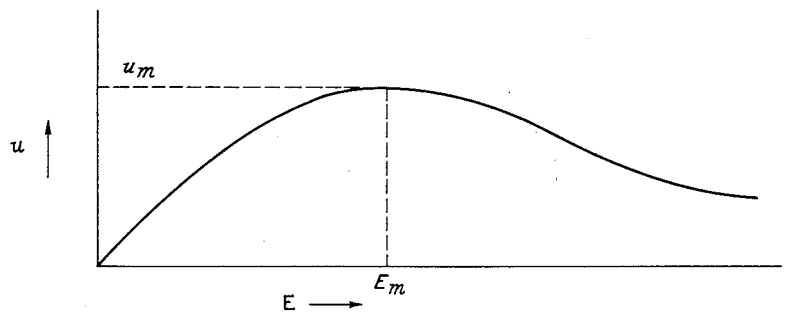
Fig. 10 is a plot of drift velocity against electric field, illustrating the decrease in the drift velocity that results after the electric field reaches the range resulting in a negative differential mobility.

We can now examine the effect of including an intermediate region in which the differential mobility $\mu^*$ is negative. In Fig. 10 there is illustrated the general character of the plot of the drift velocity $\mu$ versus electric field $E$ in a material in which a negative differential mobility exists. The maximum drift velocity is designated $u_m$ and it occurs at a field $E_m$.

That a hole can lose energy to phonons at a certain maximum average rate seems to open the possibility of making negative resistance devices in which the current decreases even with increased D. C. voltage so that negative resistance is exhibited over a wide frequency range starting with D. C. Unfortunately, when boundary conditions are considered, it is found that a device in which most of the current flow occurs in a negative differential mobility region does not necessarily show a D. C. negative resistance characteristic although such a structure may have a very favorable impulsive impedance characteristic which adapts it for use as a transit time negative resistance diode over a wide band of higher frequencies.

For example, if the p-n-p structure shown in Fig. 4A is of a material such as silicon carbide or diamond in which the valence band is relatively narrow compared to the energy gap, the voltage applied can be chosen to result in an electric field in the weakly n region which results in a negative differential mobility. Moreover, it may be advantageous in some cases to operate such diodes at elevated temperatures, for example, in excess of 100° C. to decrease the maximum power dissipation of the holes in the negative resistance region and so achieve negative differential mobility with lower electric fields.

Figure 11:
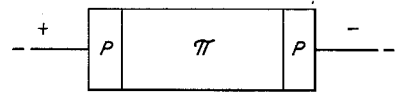
Fig. 11 illustrates a p-$\pi$-p diode which can be operated in accordance with the invention.

Alternatively, the composition of the diode shown in Fig. 4A may be modified to the p-π-p structure shown in Fig. 11. Such a structure may be formed from p-type silicon carbide by bombarding opposite phases of such a body with aluminum ions which will penetrate slightly and form regions of higher hole concentration. A subsequent anneal at high temperatures will then lead to a uniform p-π-p structure.

Figure 12:
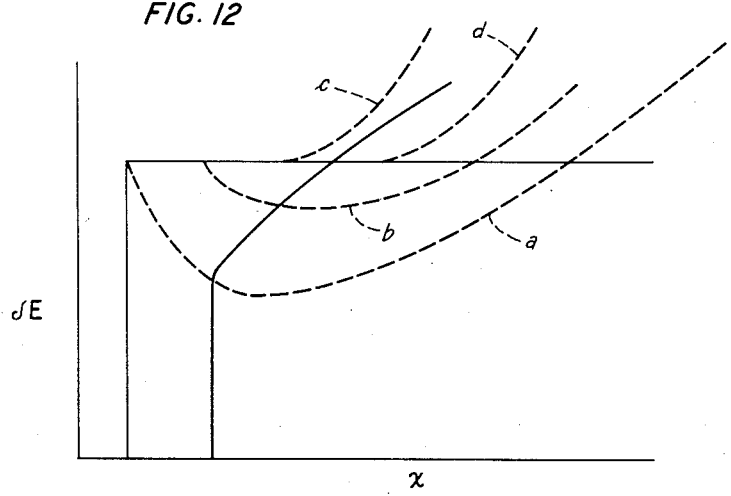
Figs. 12 and 13 illustrate characteristics of the diode shown in Fig. 11 when it is operated in a region of negative differential mobility in accordance with the invention.
Figure 13:
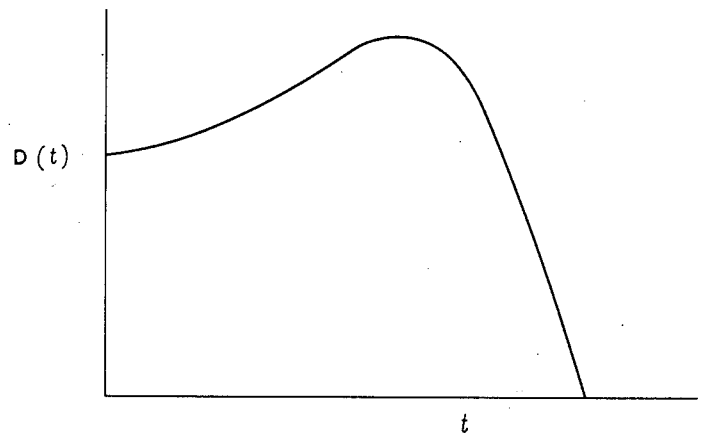

A comparison of Fig. 12 which shows the $\delta E$ curves for such a structure when the intermediate zone is operated in a region of negative differential conductivity with the curves shown in Fig. 7A points up the advantages of a region of negative differential conductivity. Fig. 13 shows a typical impulsive impedance $D(t)$ characteristic for operation in this way, illustrating the desirable convex-upwards shape as well as the delayed peak.

In diode structures of this kind, it is advantageous to have the region where the electric field is high enough for negative differential mobility also be a region of substantially zero space charge since a uniform field does not increase the likelihood of getting into the breakdown range where secondary generation of hole electron pairs result which range is high for high energy gaps.

Figure 14:
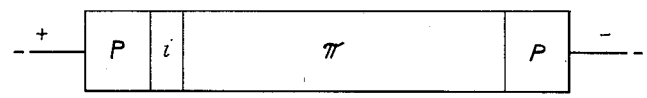
Fig. 14 shows a p-i-$\pi$-p diode which can be operated in accordance with the invention.

Fig. 14 illustrates a p-i-π-p diode to which the principles of the invention can be applied. Space charge emission enters the intrinsic layer which is of a width that at its boundary with the π region, the electric field has a value $E_3$ which exceeds the value $E_m$ corresponding to the field at which the drift velocity is a maximum in Fig. 10. At this point the hole space charge is $$\rho_3=J/u_3 \quad (54)$$

where $u_3$ is $u(E_3)$. In the π-region this space charge is compensated by acceptors to produce a region of uniform field in which the differential mobility $\mu^*$ is negative.

If the π-region is wide compared to the I-region, then the transit time through it will also be relatively large. As a consequence $\delta Q$ will be transferred quickly into the π-region. From that line in $\delta E_m$ curves, like those of Fig. 7A, will show an exponential increase with time and also with distance since for this case of constant $u$ in the π-region, time and distance are linearly related. This will lead to a $D(t)$ of the form $$D(t)=(u_3/K)(S-t)\exp|\mu^*\rho_3/K|t \quad (55)$$

where the absolute value signs emphasize that for this case of negative $\mu^*$ there is a build up in time. This form of $D(t)$ is always convex upwards and, in fact, if $$S|\mu^*\rho_3/K|>1 \qquad (56)$$

it starts with a positive slope at $s=0$ so that the transient voltage actually builds up initially with time. Such a characteristic is well suited for providing a negative resistance over a wide band of frequencies.

The same considerations are applicable to the case where the intrinsic zone of the diode shown in Fig. 14 is replaced by a weakly n-type zone so long as there is substantial space charge balance throughout the $\pi$-zone, which zone is made wide relative to the weakly n-type zone so that most of the transit time of the hole carriers is spent in it.

Figure 15:
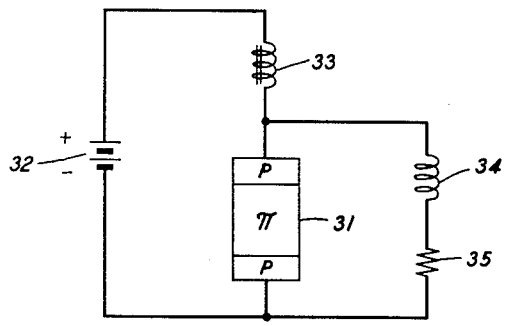
Figs. 15 and 16 show an oscillator and a dissected amplifier, respectively, which use a negative resistance diode of the invention as a source of alternating power.

As has been indicated above, there are various possible applications of negative resistance diodes in accordance with the invention. In the oscillator shown Fig. 15, the p–$\pi$–p diode 31 is supplied from a high impedance source, such as the battery 32 and choke coil 33. The series connected inductance 34 and resistance 35 are shunted across the diode 31. The inductance 34 is chosen to resonate with the capacitance of the diode 31 at a frequency whose period is suitably related to the transit time of the hole carriers through diode 31. The Q of the circuitry loading the diode is chosen so that the combined circuit has a negative Q. Accordingly, oscillations will result, building up until nonlinear effects limit the amplitude.

Figure 16:
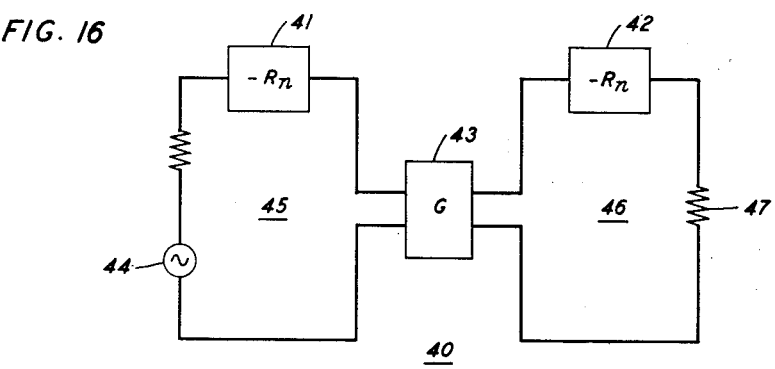

Fig. 16 shows a dissected amplifier circuit 40 in which a pair of negative resistance diodes 41, 42 in accordance with the invention are cascaded with a non-reciprocal element 43. By way of example, the element 43 can be a Hall effect plate or gyrator of the kind described in application Serial No. 219,342 filed April 5, 1951 and is adapted to provide low attenuation to signal transmission from the branch 45, including the signal source 44 and the diode 41, to the branch 46, including the load 47 and diode 42, and substantially infinite attenuation to transmission from branch 46 to branch 45. Amplifier arrangements of this kind are described in greater detail in application Serial No. 302,278 filed August 1, 1952. Various other forms of dissected amplifiers in which diodes in accordance with the invention may be incorporated are described in the earlier mentioned applications.

It is to be understood that the various arrangements which have been described are merely illustrative of the general principles of the invention. Various modifications will be obvious to workers skilled in the art without departing from the spirit and scope of the invention. For example, the principles of the present invention may advantageously be combined with the convergent geometry principles of the parent application.

What is claimed is:

1. In a translator which exhibits negative resistance to an alternating signal, a semiconductive body including a plurality of contiguous zones of different predominances of charge carriers and biasing means for establishing in an intermediate zone of said plurality an electric field which puts that zone in the range of negative differential mobility for charge carriers traveling through said zone.

2. In a signal translator which exhibits negative resistance, a two-terminal semiconductive body including a plurality of contiguous zones of different predominances of charge carriers and biasing means including ohmic connections to the two terminals for establishing in an intermediate zone of said plurality an electric field which puts the zone in the range of negative differential mobility for charge carriers moving through said zone.

3. In a signal translator which exhibits negative resistance, a semiconductive body including a plurality of contiguous zones of different predominances of charge carriers, terminal connections to two end zones of said plurality, and biasing means connected to said terminal connections for establishing in an intermediate zone of said plurality an electric field which puts the zone in the range of negative differential mobility.

4. In a signal translator which exhibits negative resistance to alternating signals, a semiconductive body including a transit time zone, means for injecting charge carriers of one sign into said transit time zone, and means for collecting charge carriers of said sign from the transit time zone, and biasing means including connections to said injecting and collecting means for establishing in the transit time zone an electric field which puts it in the region of negative different mobility.

5. In a signal translating device which exhibits negative resistance to an alternating signal, a semiconductive body of a material which is characterized by a forbidden energy gap which is wide relative to its valence band and including a plurality of contiguous zones having different concentrations of holes, and biasing means for establishing in an intermediate one of said zones an electric field which results in a negative differential mobility for holes traveling through said zone.

6. In a translating device which exhibits negative resistance to alternating signals, a semiconductive body including an intermediate zone and two terminal zones on opposite sides of said intermediate zone and having a higher predominance of hole charge carriers, said body further characterized as being of a material in which the forbidden energy gap is wide relative to the valence band, and biasing means including ohmic connections to said two terminal zones for establishing an electric field in said intermediate zone which results in a negative differential mobility for holes moving in said zone.

7. A signal translator for providing negative resistance to an alternating signal comprising a semiconductive diode of silicon carbide including two terminal zones of p-type conductivity and an intermediate zone having a smaller preponderance of hole charge carriers and being wide relative to the two terminal zones and biasing means including connections to said terminal zones for establishing in the intermediate zone an electric field which puts it in a range of negative differential mobility.

8. A signal translator for providing negative resistance to an alternating signal comprising a semiconductive body comprising a plurality of contiguous zones of difference predominances of charge carriers including two terminal zones of p-type conductivity and intermediate zones of intrinsic and $\pi$-type conductivity, the $\pi$ zone being wide relative to the intrinsic zone, and biasing means including connections to the terminal zones for making the $\pi$ zone a region of negative differential mobility.

9. A signal translator according to claim 8 in which the relative concentrations of charge carriers in the intrinsic and $\pi$ zones establish a uniform space charge field in the $\pi$ zone.

10. An oscillator comprising a semi-conductive diode including a plurality of contiguous zones of different predominances of charge carriers and an external circuit connected between the two terminals of said diode including biasing means for establishing in an intermediate zone of said plurality an electric field which puts said zone in the range of negative differential mobility for charge carriers traveling through said zone.

11. A dissected amplifier comprising a semiconductive diode including a plurality of contiguous zones of different predominances of charge carriers and an external circuit connected between the two terminals of said diode including biasing means for establishing in an intermediate zone of said plurality an electric field which puts said zone in the range of negative differential mobility for charge carriers traveling through said zone, a signal source and a load on opposite sides of said diode, and non-reciprocal means for providing low attenuation to transmission in the direction from the signal source to the load and high attenuation to transmission in the direction from the load to the signal source.

12. In combination, a semiconductive body including a plurality of zones of different predominances of charge carriers and of a material in which the maximum energy which can be absorbed by the charge carriers from an electric field within the body is less than the energy gap between the valence and conduction bands, and biasing means including connections to said body for establishing in an intermediate zone of said body an electric field in the negative differential mobility range.

References Cited in the file of this patent

UNITED STATES PATENTS 2,569,347     Shockley _____ Sept. 25, 1951